US011467795B2

(12) United States Patent
Trachtenberg

(10) Patent No.: US 11,467,795 B2
(45) Date of Patent: *Oct. 11, 2022

(54) SYSTEMS AND METHODS FOR MAPPING AN ORCHESTRATED DIGITAL DISPLAY SYSTEM

(71) Applicant: Videri Inc., New York, NY (US)

(72) Inventor: Marc Trachtenberg, New York, NY (US)

(73) Assignee: Videri Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/432,041

(22) Filed: Jun. 5, 2019

(65) Prior Publication Data

US 2019/0369941 A1    Dec. 5, 2019

Related U.S. Application Data

(60) Provisional application No. 62/680,927, filed on Jun. 5, 2018.

(51) Int. Cl.
G06F 3/14 (2006.01)
G06F 3/147 (2006.01)
(Continued)

(52) U.S. Cl.
CPC .......... *G06F 3/1446* (2013.01); *G06F 3/0481* (2013.01); *G06F 3/04845* (2013.01);
(Continued)

(58) Field of Classification Search
CPC .. G06F 3/1446; G06F 3/0481; G06F 3/04845; G06F 3/147; G06N 20/00; H04L 67/10
See application file for complete search history.

(56) References Cited

U.S. PATENT DOCUMENTS 8,600,220 B2   12/2013   Bloch et al.
10,418,066 B2   9/2019   Bloch et al.
(Continued)

FOREIGN PATENT DOCUMENTS

KR    1020160098841       8/2016
WO    2018064660 A1       4/2018

OTHER PUBLICATIONS

Extended European Search Report in EP 17873419.0 (dated Mar. 18, 2020).
(Continued)

*Primary Examiner* — Roberto Borja
(74) *Attorney, Agent, or Firm* — Suiter Swantz pc llo

(57) ABSTRACT

A system and associated method for mapping an orchestration of multiple digital display devices to display a digital content item across the multiple digital display devices, including multiple digital display devices, a user device, and a cloud-based computing system, where the cloud-based computing system is configured to perform a machine learning operation to identify a calibration pattern associated with each digital display device and determine a position of each digital display device, and where, upon selection of a digital content item on the user device by a user, the multiple digital display devices are configured to receive data representing the digital content item and display a synchronized display representing the digital content item, the synchronized display being a continuous display that accounts for space between multiple digital display devices and only displays portions of the continuous display at locations where a digital display device is positioned.

14 Claims, 10 Drawing Sheets

(51) Int. Cl.
*H04L 67/10* (2022.01)
*G06F 3/04845* (2022.01)
*G06N 20/00* (2019.01)
*G06F 3/0481* (2022.01)
*H04N 21/43* (2011.01)

(52) U.S. Cl.
CPC ............ *G06F 3/147* (2013.01); *G06N 20/00* (2019.01); *H04L 67/10* (2013.01); *H04N 21/43079* (2020.08); *G06F 2203/04806* (2013.01); *G09G 2320/0693* (2013.01)

(56) References Cited

U.S. PATENT DOCUMENTS

| | | | |
|---|---|---|---|
| 10,460,765 B2 | 10/2019 | Bloch et al. | |
| 10,554,926 B1 | 2/2020 | Post, Jr. et al. | |
| 2005/0168399 A1* | 8/2005 | Palmquist | G06F 1/1601 |
| | | | 345/1.1 |
| 2012/0206319 A1* | 8/2012 | Lucero | H04N 21/4788 |
| | | | 345/1.3 |
| 2013/0265487 A1* | 10/2013 | Yu | G06F 3/1446 |
| | | | 348/383 |
| 2014/0253417 A1 | 9/2014 | Brown et al. | |
| 2015/0061971 A1* | 3/2015 | Choi | G06F 3/1446 |
| | | | 345/2.3 |
| 2015/0279037 A1* | 10/2015 | Griffin | G06F 3/1446 |
| | | | 345/1.3 |
| 2016/0086582 A1* | 3/2016 | Hu | G06F 3/147 |
| | | | 345/1.3 |
| 2016/0224184 A1* | 8/2016 | Nordback | G06F 3/0418 |
| 2017/0075638 A1* | 3/2017 | Poornachandran | G06F 3/1423 |
| 2017/0201740 A1* | 7/2017 | Gordon | G06F 3/1423 |
| 2017/0315772 A1* | 11/2017 | Lee | G06T 7/74 |
| 2018/0144720 A1 | 5/2018 | Trachtenberg | |
| 2019/0051268 A1* | 2/2019 | Utsch | G09G 5/12 |

OTHER PUBLICATIONS

Written Opinion of the International Searching Authority in PCT/US2019/035552 (dated Oct. 2, 2019).
International Search Report in PCT/US2019/035552 (dated Oct. 2, 2019).

* cited by examiner

SYSTEMS AND METHODS FOR MAPPING AN ORCHESTRATED DIGITAL DISPLAY SYSTEM

CROSS-REFERENCE TO RELATED APPLICATIONS

The present application claims priority to U.S. provisional application Ser. No. 62/680,927, filed Jun. 5, 2018, the disclosure of which is incorporated herein by reference in its entirety.

TECHNICAL FIELD

The present invention relates to systems and methods for mapping an orchestration of multiple digital displays in order to display one digital content item across the multiple digital displays.

BACKGROUND OF THE INVENTION

It is desirable at times to display one digital content item in a large format. To avoid the expense and complications associated with large displays such as LCD screens or projector screens, users may choose to display the item across several smaller digital displays, so that each display shows a different portion of the content item while conveying the appearance of one cohesive image. Alternatively, users may choose to display an item across multiple displays for stylist effect.

Systems currently on the market for synchronizing and orchestrating multiple displays to show a single content item are complicated and costly. Such systems generally involve an expensive video processor that is directly connected to each display by a wired video connection.

The present invention presents a system of wirelessly connected digital displays, which can quickly and easily be orchestrated to display one cohesive image using a user application connected to a cloud system, and which may be accomplished without the use of a centralized display processor and dedicated video connection to each display. In addition, the present invention presents a system and method of mapping and controlling the orchestration of these digital displays.

SUMMARY OF THE INVENTION

In general, in one aspect, the invention features a system for mapping an orchestration of multiple digital display devices to display a digital content item across the multiple digital display devices, including multiple digital display devices, where each digital display device includes a display screen, a memory, a processor, and data link capabilities; a user device including a display screen, a user interface, a memory, a processor, and data link capabilities; and a cloud-based computing system configured to communicate with the multiple digital display devices and the user device; where the cloud-based computing system is configured to perform a machine learning operation to identify a calibration pattern associated with each digital display device and determine a position of each digital display device; where, upon selection of the digital content item on the user device by a user, the multiple digital display devices are configured to receive data representing the digital content item and display, on the display screens of the multiple digital display devices, a synchronized display representing the digital content item; and where the synchronized display representing the digital content item is a display of the digital content item rendered across the multiple digital display devices in the form of a continuous display of the digital content item, accounting for space between multiple digital display devices and only displaying portions of the continuous display of the digital content item at locations where a digital display device is positioned.

Implementations of the invention may include one or more of the following features. The data link capabilities of the digital display device or the user device may be WiFi capabilities or wired Ethernet capabilities. A spatial gap distance or an orientation of each digital display device may be determined via the calibration pattern. The user device may further include a static image capture means configured to capture one or more static images of each digital display device of the multiple digital display devices and send the one or more static images to the cloud-based computing system. The user device may further include a moving image capture means configured to capture one or more moving images of each digital display device of the multiple digital display devices and send the one or more moving images to the cloud-based computing system. The cloud-based computing system and/or the user device may be configured to determine an identity, boundary, and orientation of each digital display device of the multiple digital display devices based on a representation of the multiple digital display devices. The cloud-based computing system may be further configured to perform a machine learning operation to determine a position of each digital display device based on identifying an edge of each digital display device.

The system, via the user interface of the user device, may be capable of adjusting a mapping of the digital content item to an outline of the multiple digital display devices based on a dragging operation to pan the digital content item or a pinching operation to zoom in on the digital content item. The cloud-based computing system may be further configured to process the data representing the digital content item into multiple distinct data portions corresponding to distinct display portions of the digital content item, where each distinct data portion of the multiple distinct data portions is sent to a different digital display device of the multiple digital display devices for display. Each digital display device of the multiple digital display devices may be further configured to process the data representing the digital content item and extract a distinct data portion corresponding to a distinct display portion of the digital content item, where the distinct display portion is displayed on a digital display device of the multiple digital display devices.

In general, in another aspect, the invention features a method for mapping an orchestration of multiple digital display devices to display a digital content item across the multiple digital display devices, including performing, by a cloud-based computing system, a machine learning operation to identify a calibration pattern associated with each digital display device and determine a position of each digital display device; selecting, by a user device, the digital content item; receiving, by the multiple digital display devices, data representing the digital content item; displaying, by display screens of the multiple digital display devices, a synchronized display representing the digital content item; where each digital display device of the multiple digital display devices includes the display screen, a memory, a processor, and data link capabilities; where the user device includes a display screen, a user interface, a memory, a processor, and data link capabilities; where the cloud-based computing system communicates with the multiple digital display devices and the user device; and where the synchronized display representing the digital content item is a display of the digital content item rendered across the multiple digital display devices in the form of a continuous display of the digital content item, accounting for space between multiple digital display devices and only displaying portions of the continuous display of the digital content item at locations where a digital display device is positioned.

Implementations of the invention may include one or more of the following features. The data link capabilities of the digital display device or the user device may be WiFi capabilities or wired Ethernet capabilities. A spatial gap distance or an orientation of each digital display device may be determined via the calibration pattern. The user device may further include a static image capture means for capturing one or more static images of each digital display device of the multiple digital display devices and sending the one or more static images to the cloud-based computing system. The user device may further include a moving image capture means for capturing one or more moving images of each digital display device of the multiple digital display devices and sending the one or more moving images to the cloud-based computing system. The cloud-based computing system and/or the user device may determine an identity, boundary, and orientation of each digital display device of the multiple digital display devices based on a representation of the multiple digital display devices. The cloud-based computing system may further perform a machine learning operation to determine a position of each digital display device based on identifying an edge of each digital display device.

The method may further include adjusting, by the user interface of the user device, a mapping of the digital content item to an outline of the multiple digital display devices based on a dragging operation to pan the digital content item or a pinching operation to zoom in on the digital content item. The method may further include processing, by the cloud-based computing system, the data representing the digital content item into multiple distinct data portions corresponding to distinct display portions of the digital content item, and sending each distinct data portion of the multiple distinct data portions to a different digital display device of the multiple digital display devices for display. The method may further include processing, by each digital display device of the multiple digital display devices, the data representing the digital content item, extracting a distinct data portion corresponding to a distinct display portion of the digital content item, and displaying the distinct display portion on a digital display device of the multiple digital display devices.

DETAILED DESCRIPTION OF THE INVENTION

Figure 1:
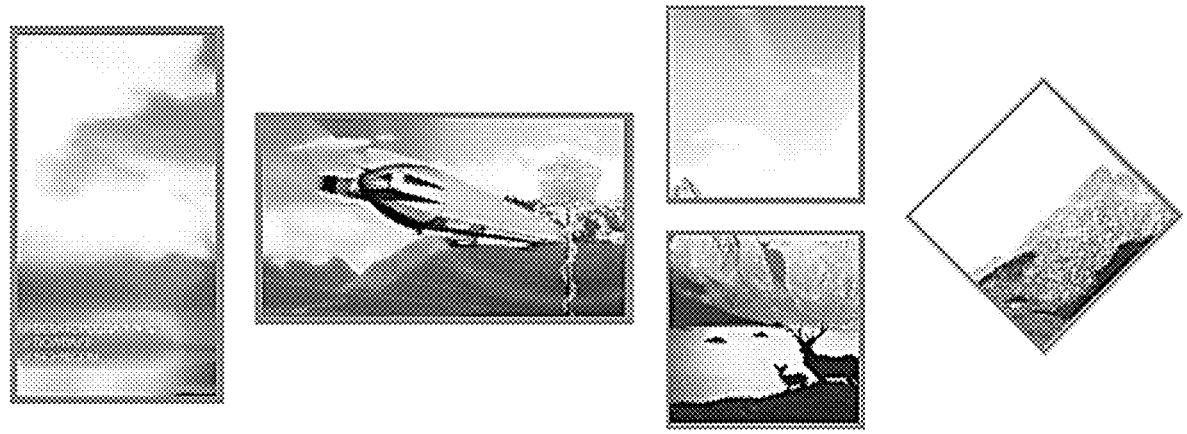
FIG. 1 shows a digital content item rendered across various digital displays as if the digital content item were displayed on one continuous surface with the image being visible only where an actual digital display is positioned.

The present invention enables a user to display one digital content item on multiple digital displays, herein referred to as Orchestrated Displays, by coordinating and synchronizing digital media content rendering and playback across the displays. Orchestrated Displays refers to the ensemble of displays that operate in a coordinated and synchronized manner. The content item may be a static image, a video clip, graphics animation, or an application ("app"). The digital displays do not need to be equally sized, adjacent, or aligned. They may have different orientations and may have spatial gaps between the digital displays. In the latter case, the digital content item is rendered across the various digital displays as if the digital content item were displayed on one continuous surface with the image being visible only where an actual digital display is positioned, as seen in FIG. 1.

Figure 2:
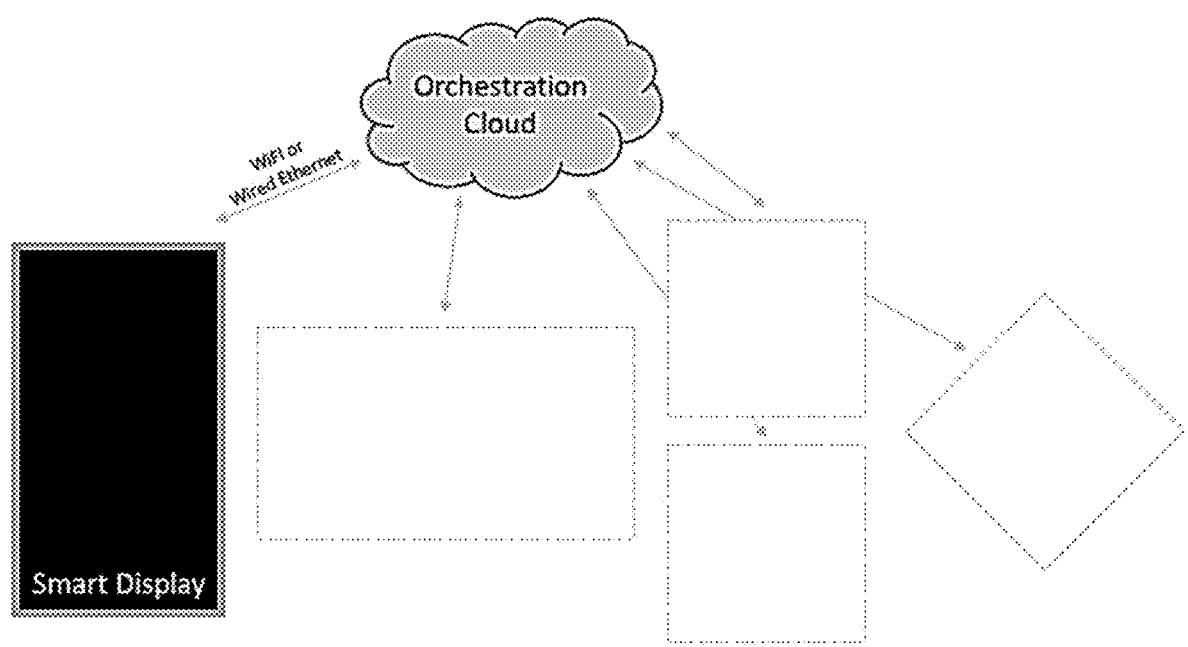
FIG. 2 shows a topological illustration of digital displays connected to a Cloud System via the Internet.
Figure 3:
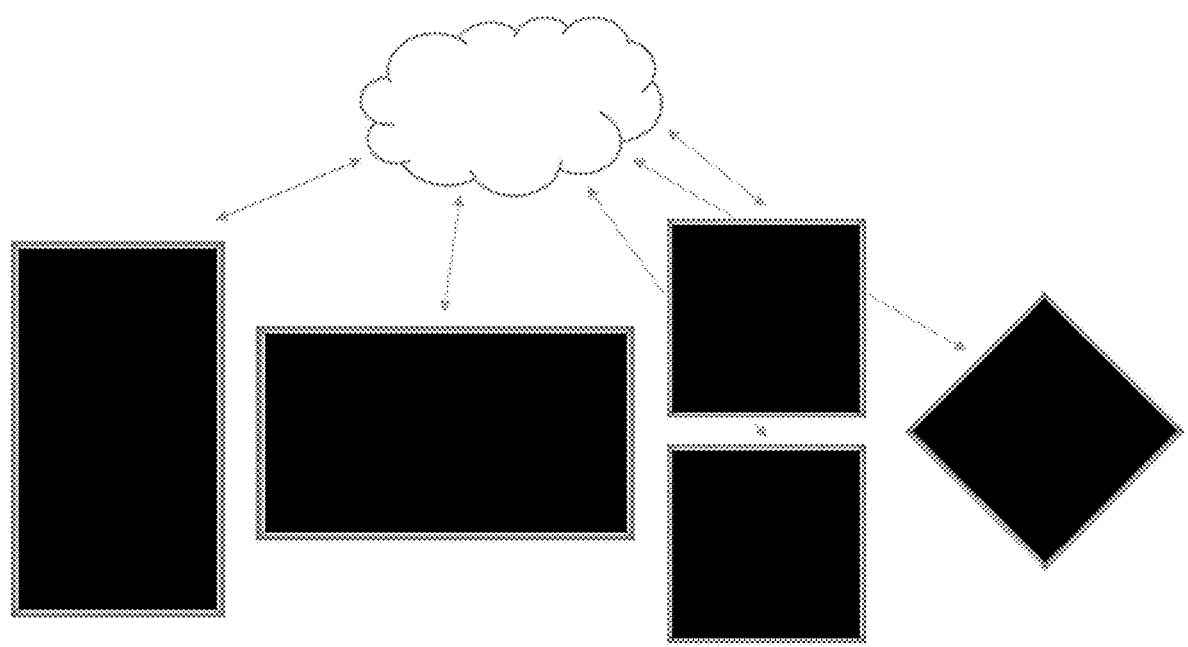
FIG. 3 shows an outline illustration of digital displays connected to a Cloud System.

The Orchestrated Displays are Internet-enabled, preferably by WiFi, (wired) Ethernet, or other type of data link, and include a digital display screen, i.e., an LCD, LED, OLED, QLED or digital ink screen, a memory, and a processor. As illustrated in FIG. 2, each digital display connects to a Cloud System via the Internet before it can be used in a set of Orchestrated Displays. In this case, no other connection with the Orchestrated Displays is required.

Prior connection of the digital display ensures that the software running in each display is communicating with the Cloud System. During the display registration process, each digital display is assigned a unique identifier, such as a serial number or MAC address, and the attributes of the display, including, at a minimum, the height and width of the display's active area and pixel resolution, are recorded.

Figure 4:
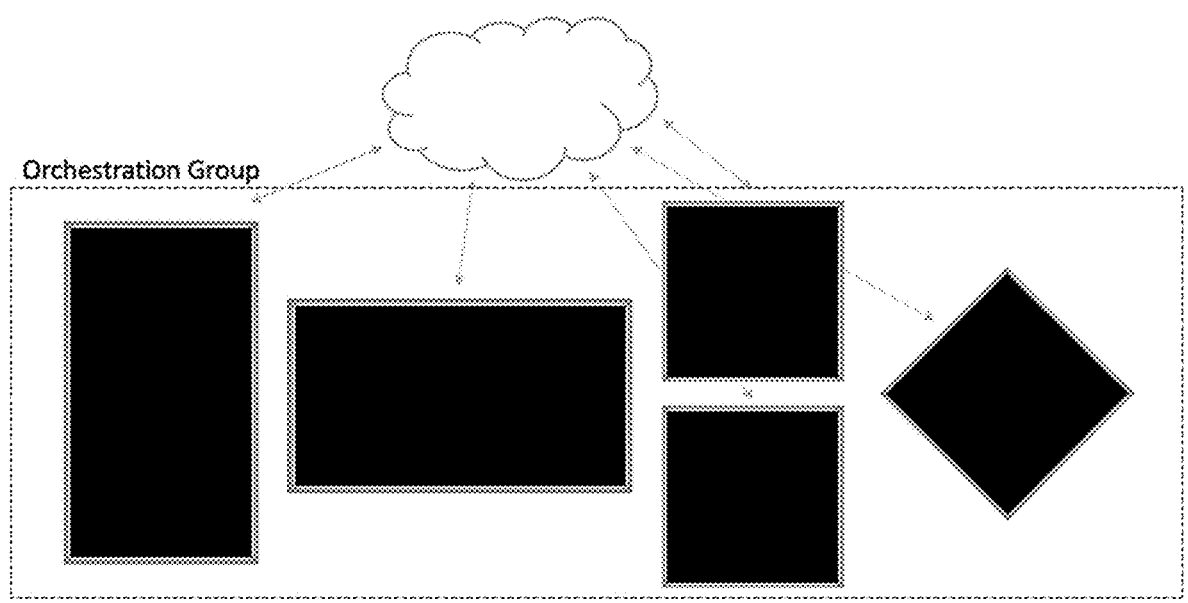
FIG. 4 shows a group of orchestrated digital displays, referred to as an Orchestration Display group.

Orchestration of displays according to the present invention occurs in two phases, namely display mapping and content preparation and rendering. The purpose of display mapping is to define the specific size, relative location, and orientation of each of the Orchestrated Displays to determine which part of each image is displayed on each digital display. To begin the display mapping phase, the Cloud System interacts with a user via an interface on a mobile computing device to create an Orchestration Group and to assign registered digital displays to that group, as seen in FIG. 4. The creation of an Orchestration Group can be explicit where the user selects each digital display to be part of the Orchestration Group. Alternately, digital displays that may become part of an Orchestration Group can be derived from a mapping process of the present invention described herein.

Figure 5:
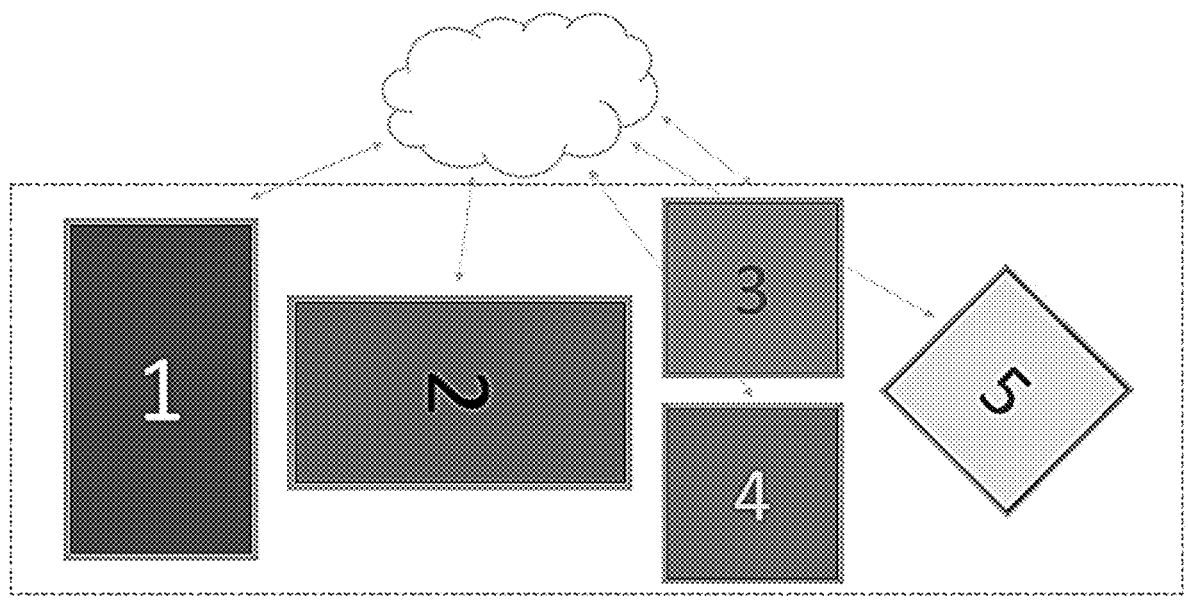
FIG. 5 shows an example of possible calibration patterns on displays in an Orchestration Display group.
Figure 6:
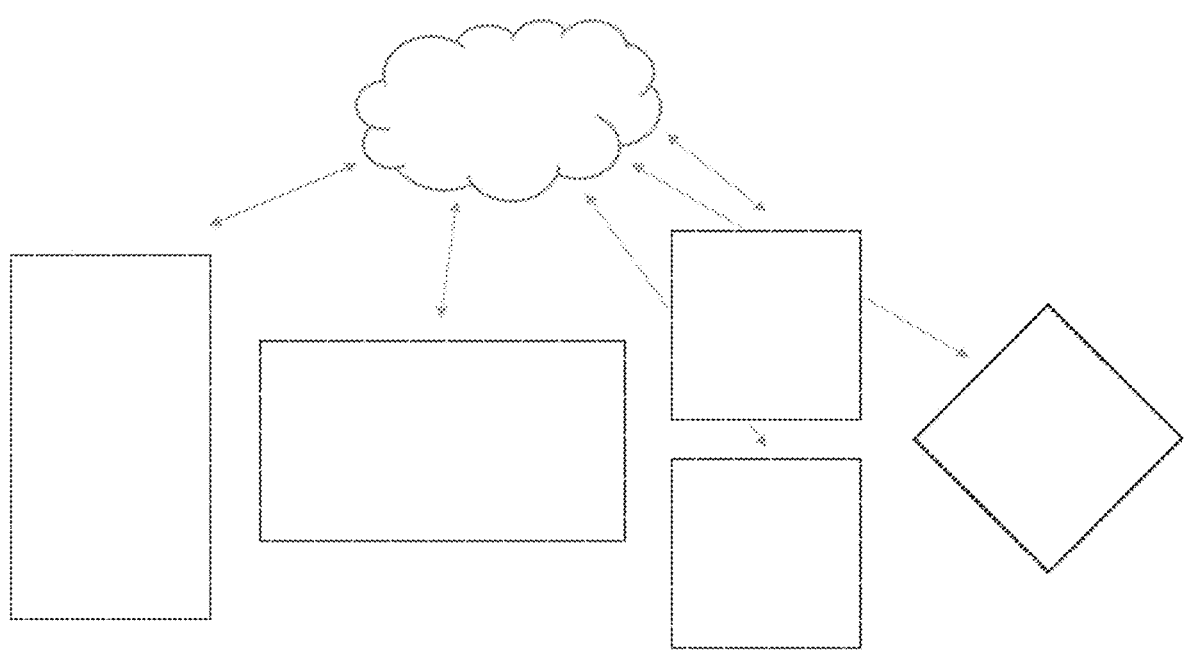
FIG. 6 shows an orchestration outline of the digital displays.

To determine the attributes of each digital display, the user interface, in communication with the Cloud System or each digital display, displays a calibration pattern on each display that is part of the Orchestrated Display group. The calibration pattern is unique to each digital display and includes a uniquely identifiable graphics image. The unique visual identifier can range from a simple number to patterns and complex images embedding encoded information, or can be identified through use of a machine learning algorithm. An exemplary calibration is shown in FIG. 5.

In a preferred embodiment, a mobile computing device having a processor and a camera or similar image capture means, such as a smartphone or a tablet, is connected to the Cloud System and used to create an accurate representation of the group of digital displays, i.e., the Orchestration Group, to capture their relative geometry, positions, and other attributes. In one embodiment, this representation is a single static image including all digital displays that are part of the Orchestration Group. In another embodiment, the representation is derived from a video of all digital displays that are part of the Orchestration Group. In another embodiment, the representation is created with multiple images that are stitched together to create a coherent representation of all digital displays that are part of the Orchestration Group. Use of a panoramic image is included in this embodiment. In another embodiment, the representation is produced by using one or more images in a non-visible wavelength range (infrared, sound wave, etc.) or any other spatial mapping technology delivering sufficiently accurate data.

The embodiments of the present invention, such as the aforementioned embodiments, may be configured to operate by capturing images of the multiple digital displays and/or capturing images of a proxy for the multiple digital displays, such as a remote device screen displaying an image of the multiple digital displays.

The representation of the Orchestration Group is either uploaded to the Cloud System, where it is analyzed to determine the identity, boundaries, and orientation of each digital display device, or processed on the mobile computing device such that the resulting identity, boundaries, and orientation of each digital display device are uploaded to the Cloud.

In a preferred embodiment, a machine learning algorithm performs two actions: identifying the calibration pattern used with respect to a digital display and accurately determining the position of a digital display in its physical space by identifying the edge of each digital display. The positioning data of each digital display is then projected to a flat plane to correct any skewed perspective of the canvas and provide a realistic representation of the digital display notwithstanding the viewing angle of the initial representation. This information constitutes the Orchestration Attributes. The Orchestration Attributes and associated data can be calculated in any of a variety of ways.

Orientation of each digital display may be determined using the orientation sensor built into the displays or by analyzing the relative orientation of the calibration patterns as discussed above, as shown in FIG. 5.

Figure 7:
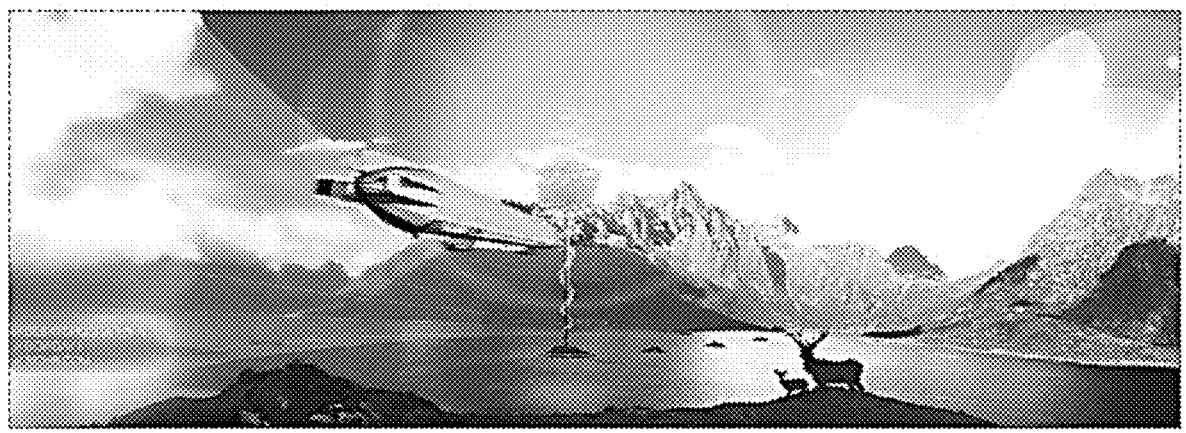
FIG. 7 shows an exemplary digital content item.

The content preparation and render phase begins with a user selecting a digital content item, such as the image seen in FIG. 7, to be displayed. A user interface located on a mobile computing device or any computing user device connected to the Cloud System allows a user to select a digital content item and assign it to the Orchestrated Display group to be displayed in real-time or at a later time. The user interface may display an outline of the orchestration group as an overlay on top of the digital content item and permit the user to drag/pan or pinch/zoom the digital content item on the mobile computing device to determine a specific fit with the various Orchestrated Displays. In another embodiment, the user interface may only display the portion of the digital content item that is visible on the Orchestrated Displays and permit the user to drag/pan or pinch/zoom the digital content item to determine a specific fit with the various Orchestrated Displays. The relative changes to the digital content item may or may not be reflected in real-time on the Orchestrated Displays.

Figure 8:
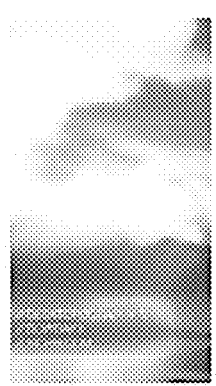
FIG. 8 shows specific parts of the digital content item seen in FIG. 7 to be arranged across various displays shown in FIG. 6.
Figure 8:
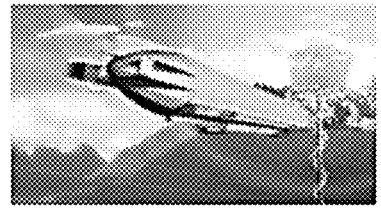
Figure 8:
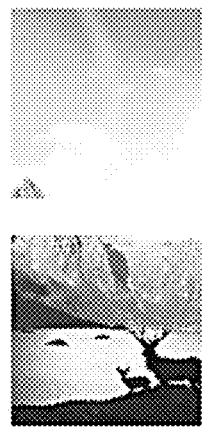
Figure 8:
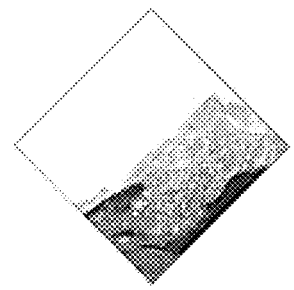
Figure 9:
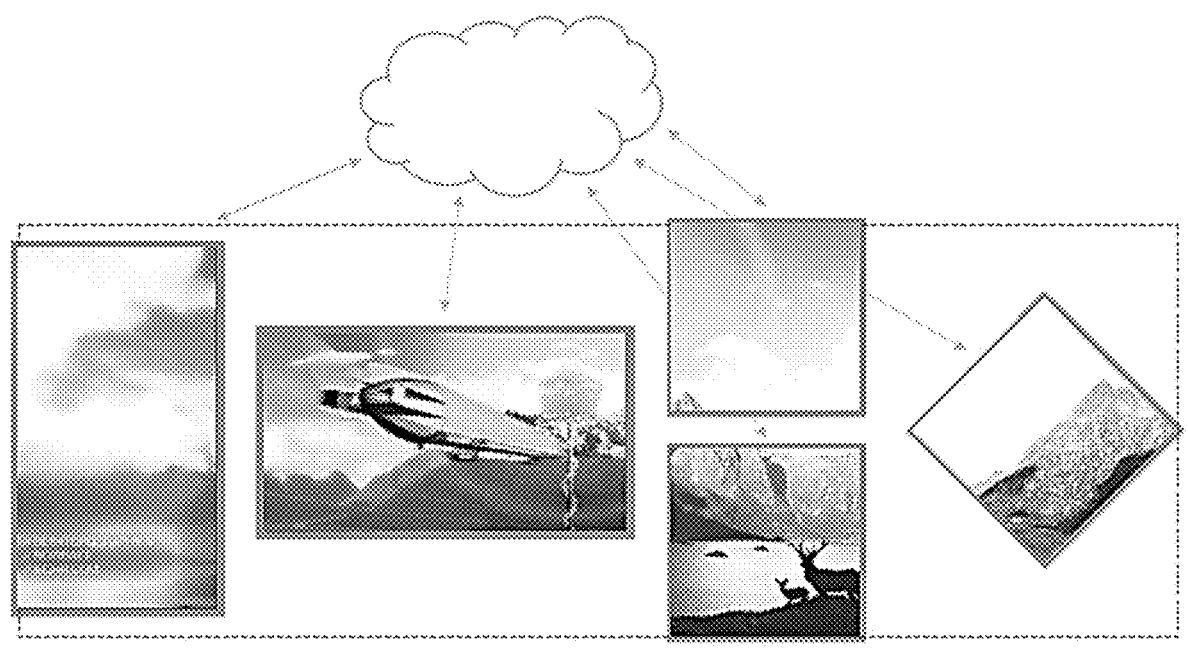
FIG. 9 shows each digital display of multiple digital displays receiving information over a network.
Figure 10:
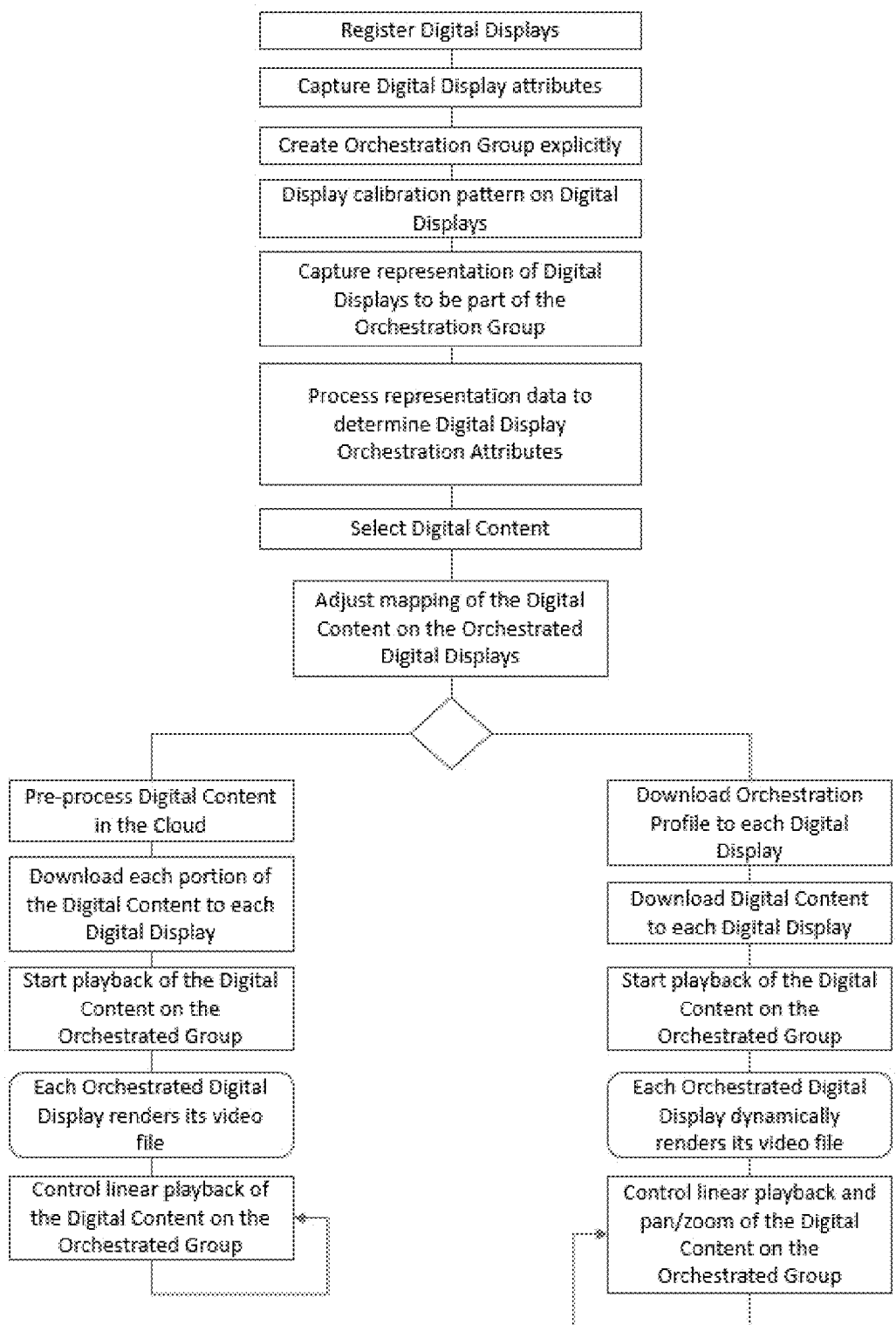
FIG. 10 shows a flowchart of an orchestration mapping process of the present invention.

In one implementation, the Orchestration Attributes stored in the Cloud System are used to pre-process the digital content item and create a separate file for each digital display that is part of the Orchestrated Display group, where the separate files incorporate the specific parts of the content item that will be displayed on the specific displays. The specific content of each file is determined in order to harmonize the display of the digital content item across all of the Orchestrated Displays, considering their respective size, relative distance, orientation, and resolution, as well as other attributes, such as color palette. The specific portions of the digital content item to be displayed are shown in FIG. 8. Time synchronization information may also be added to each file to ensure strict playback synchronization in the case of video, animation, or app media. The files are downloaded to the Orchestrated Displays over wired, WiFi, or other data link connections and stored in each display. Upon receiving a command to play the orchestrated content, each Orchestrated Display starts playing its respective media file synchronously with the other digital displays that are part of the Orchestrated Display group. Synchronization is ensured using precise timing information distributed in real-time over the network. Each digital display receives this timing information over the network and precisely synchronizes image playback frame accurately, as illustrated in FIG. 9.

In another implementation, Orchestrated Attributes are downloaded to each digital display to make the display "aware" of its relative position and orientation within the Orchestrated Display group. Time synchronization information is added to the digital content item before it is downloaded and stored in all digital displays that are part of the Orchestrated Display group, meaning that the same file containing the complete digital content item is downloaded to each display. The processor embedded in each digital display uses the attributes to extract the portion of the digital content item that will be displayed on its specific display surface by cropping the content item to the display size and location, rotating images to align with surface orientation of the digital display, and adjusting the digital content item to harmonize display resolution, color palette, and other pertinent visual attributes. Time synchronization is preserved during the processing. Cropping and rotation of the digital content item occurs either in real-time during playback or upon receiving the original content file, in which case the extracted portion of the content item is stored locally to be used for synchronized playback when needed. During playback, synchronization is ensured using precise timing information distributed in real-time over the network. Each digital display receives this timing information over the network and precisely synchronizes image playback frames accurately. The user may control the exact location and orientation of the digital content item mapped across the Orchestrated Displays in real-time via the user interface of an application running on a mobile computing device that may be connected to the Cloud for controlling the Orchestrated Displays. The user may pinch the digital content item on the user interface to instantaneously adjust the overall zoom of the digital content item that is visible across the Orchestrated Displays or the user may drag the digital content item on the user interface to instantaneously move the digital content item that is visible across the Orchestrated Displays.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A system for mapping an orchestration of multiple digital display devices to display a digital content item across the multiple digital display devices, comprising:
    multiple digital display devices, wherein each digital display device includes a display screen, a memory, a processor, and data link capabilities, wherein each of the multiple digital display devices is disposed on a same planar surface such that the display screens of each of the multiple digital display devices are parallel to each other;
    a user device including a display screen, a user interface, a memory, a processor, and data link capabilities, said user interface configured to display an outline representing an orchestration of the multiple digital display devices as an overlay on a visual representation of the digital content item, such that the outline accounts for spacing in the planar surface between each of the multiple display devices represented in the outline, and configured to permit a user to move and size the visual representation of the digital content item to adjust a display of the digital content item on the display screens of the multiple digital display devices; and
    a cloud configured to communicate with the multiple digital display devices and the user device via a network;
    wherein the cloud is configured to perform a machine learning operation to identify a calibration pattern associated with each digital display device and determine a position of each digital display device;
    wherein, upon selection of the digital content item on the user interface of the user device by the user, the multiple digital display devices are configured to receive data representing the digital content item and display, on the display screens of the multiple digital display devices, a synchronized display representing the digital content item;
    wherein the synchronized display representing the digital content item is the display of the digital content item rendered across the multiple digital display devices in the form of a continuous and incomplete display of the digital content item, the display of the digital content item being incomplete as a result of accounting for space between the display screens of the multiple digital display devices and only displaying portions of the display of the digital content item corresponding to locations where a display screen of a digital display device is positioned;
    wherein the user device is not a digital display device of the multiple digital display devices and is not a part of the orchestration of the multiple digital display devices displaying the synchronized display; and
    wherein the user device further includes a moving image capture means configured to capture one or more moving images of each digital display device of the multiple digital display devices and send the one or more moving images to the cloud;
    wherein the cloud is further configured to perform a machine learning operation to determine a position of each digital display device based on identifying an edge of each digital display device.

2. The system of claim 1, wherein the data link capabilities of the digital display device or the user device are WiFi capabilities or wired Ethernet capabilities.

3. The system of claim 1, wherein a spatial gap distance or an orientation of each digital display device is determined via the calibration pattern.

4. The system of claim 1, wherein the user device further includes a static image capture means configured to capture one or more static images of each digital display device of the multiple digital display devices and send the one or more static images to the cloud.

5. The system of claim 1, wherein the cloud and/or the user device is configured to determine an identity, boundary, and orientation of each digital display device of the multiple digital display devices based on a representation of the multiple digital display devices.

6. The system of claim 1, wherein the cloud is further configured to process the data representing the digital content item into multiple distinct data portions corresponding to distinct display portions of the digital content item, and wherein each distinct data portion of the multiple distinct data portions is sent to a different digital display device of the multiple digital display devices for display.

7. The system of claim 1, wherein each digital display device of the multiple digital display devices is further configured to process the data representing the digital content item and extract a distinct data portion corresponding to a distinct display portion of the digital content item, and wherein the distinct display portion is displayed on a digital display device of the multiple digital display devices.

8. A method for mapping an orchestration of multiple digital display devices to display a digital content item across the multiple digital display devices, comprising:
    performing, by a cloud, a machine learning operation to identify a calibration pattern associated with each digital display device and determine a position of each digital display device;
    selecting, by a user interface of a user device, the digital content item;
    receiving, by the multiple digital display devices, data representing the digital content item;
    displaying, by display screens of the multiple digital display devices, a synchronized display representing the digital content item;
    wherein each digital display device of the multiple digital display devices includes the display screen, a memory, a processor, and data link capabilities;
    wherein each of the multiple digital display devices is disposed on a same planar surface such that the display screens of each of the multiple digital display devices are parallel to each other;
    wherein the user device includes a display screen, the user interface, a memory, a processor, and data link capabilities, said user interface displaying an outline representing an orchestration of the multiple digital display devices as an overlay on a visual representation of the digital content item, such that the outline accounts for spacing in the planar surface between each of the multiple display devices represented in the outline, and permitting a user to move and size the visual representation of the digital content item to adjust a display of the digital content item on the display screens of the multiple digital display devices;
    wherein the cloud communicates with the multiple digital display devices and the user device via a network;

wherein the synchronized display representing the digital content item is the display of the digital content item rendered across the multiple digital display devices in the form of a continuous and incomplete display of the digital content item, the display of the digital content item being incomplete as a result of accounting for space between the display screens of the multiple digital display devices and only displaying portions of the display of the digital content item corresponding to locations where a display screen of a digital display device is positioned;

wherein the user device is not a digital display device of the multiple digital display devices and is not a part of the orchestration of the multiple digital display devices displaying the synchronized display; and wherein the user device further includes a moving image capture means for capturing one or more moving images of each digital display device of the multiple digital display devices and sending the one or more moving images to the cloud;

wherein the cloud further performs a machine learning operation to determine a position of each digital display device based on identifying an edge of each digital display device.

9. The method of claim 8, wherein the data link capabilities of the digital display device or the user device are WiFi capabilities or wired Ethernet capabilities.

10. The method of claim 8, wherein a spatial gap distance or an orientation of each digital display device is determined via the calibration pattern.

11. The method of claim 8, wherein the user device further includes a static image capture means for capturing one or more static images of each digital display device of the multiple digital display devices and sending the one or more static images to the cloud.

12. The method of claim 8, wherein the cloud and/or the user device determines an identity, boundary, and orientation of each digital display device of the multiple digital display devices based on a representation of the multiple digital display devices.

13. The method of claim 8, further comprising processing, by the cloud, the data representing the digital content item into multiple distinct data portions corresponding to distinct display portions of the digital content item, and sending each distinct data portion of the multiple distinct data portions to a different digital display device of the multiple digital display devices for display.

14. The method of claim 8, further comprising processing, by each digital display device of the multiple digital display devices, the data representing the digital content item, extracting a distinct data portion corresponding to a distinct display portion of the digital content item, and displaying the distinct display portion on a digital display device of the multiple digital display devices.

* * * * *